No. 893,307. PATENTED JULY 14, 1908.
J. W. CLOUD.
FLUID PRESSURE BRAKE.
APPLICATION FILED NOV. 10, 1904.
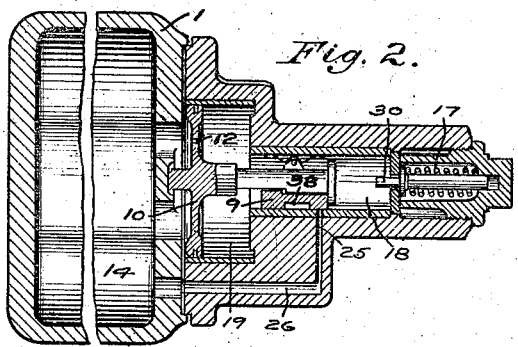
Fig. 2.
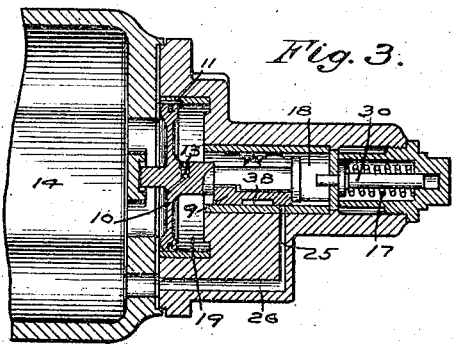
Fig. 3.
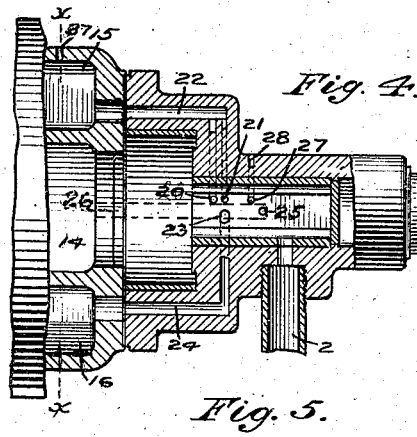
Fig. 4.
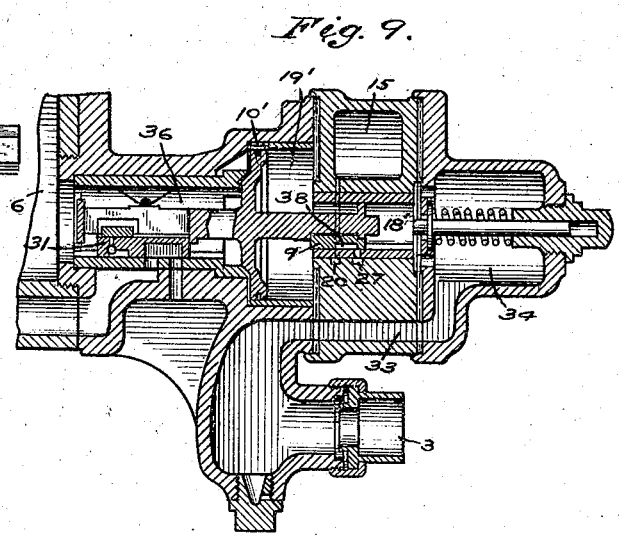
Fig. 9.
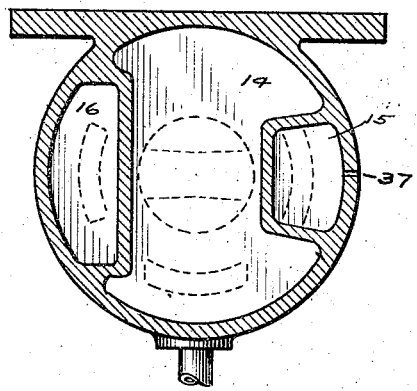
Fig. 5.
Fig. 1.
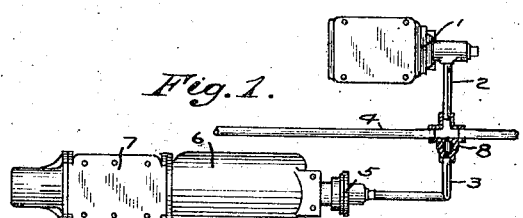
Fig. 6. Fig. 7. Fig. 8.
WITNESSES
J. W. Custer
James B. MacDonald
INVENTOR
John W. Cloud
by E. Wright
Att'y.

UNITED STATES PATENT OFFICE.

JOHN WILLS CLOUD, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 893,307.     Specification of Letters Patent.     Patented July 14, 1908.

Application filed November 10, 1904. Serial No. 232,121.

*To all whom it may concern:*

Be it known that I, JOHN W. CLOUD, a citizen of the United States, residing in London, England, have invented a certain new and useful Improvement in Fluid-Pressure Brakes, of which the following is a specification.

This invention relates to automatic fluid pressure brake apparatus.

The main object of this invention is to provide means whereby a quickened partial, or service application of automatic compressed air brakes may be had without bringing the full action of the brakes into operation.

A further object of the invention is to provide means whereby a quickened complete, or emergency, action of the brakes may be had, when desired, similar to the quick action which is obtained by certain forms of quick acting triple valves and accelerators, already known and used. Up to the present time all known forms of quick acting brake are quick acting only when the brake is in full operation.

The importance of the improvement disclosed in this invention will be understood from the following considerations. When a partial, or service, application of the brakes is to be made, it is necessary to make only a gradual and comparatively small reduction of pressure in the train pipe at the locomotive, as otherwise the brakes would be applied too strongly at the forward end of the train before they are applied at all at the rear end of the train, or else a complete, or emergency, action of the brakes would follow. Further, with a first application of the brakes, it is necessary to fill the brake cylinder from practically a vacuum up to atmospheric pressure before any effective pressure for braking is obtained against the piston. The auxiliary reservoir of each vehicle is usually made of such capacity that its volume is from, say, three to three and one-half times the space described by the brake piston in its normal travel. The air in the auxiliary reservoir must expand to fill this vacuum, and as this pressure reduces only as much as the train pipe pressure is reduced, it requires a reduction of between 4 and 5 lbs. in the train pipe pressure to fill the brake cylinder up to atmospheric pressure, before any effective braking pressure is obtained; after this, a reduction of 1 lb. in the train pipe and the auxiliary reservoir pressure will increase the braking pressure approximately 3½ lbs. per sq. in. From these facts, and considering the perfect elasticity of air, it will be understood that, when it is desired to make a first partial, or service, application of the brakes on a long train, it may require several seconds to make a reduction throughout the long train pipe, by opening it slightly at one place only, as on the locomotive, sufficient to produce any considerable braking effect.

In carrying out the first object of the invention in the preferred form of the device, a small expansion chamber, say approximately one-sixth to one-twelfth of the volume of the section of train-pipe, is provided on each vehicle, with a small auxiliary reservoir and a triple valve, adapted to open the train-pipe to this chamber by pressure from the auxiliary reservoir so as to permit the air in the train pipe to expand to fill the chamber, when the brakes are applied by a certain small reduction of train pipe pressure for a first application of the brakes, and to close this opening and open an exit passage from the small expansion chamber to the atmosphere, when pressure is restored to the train pipe to release the brakes.

To attain the second object of this invention, a second larger opening to the atmosphere is made from the train pipe on each vehicle, adapted to be opened by a further movement of the triple valve piston and valve which constitutes a part of this device, by pressure from the auxilliary reservoir used therewith, when a larger or sudden reduction of train pipe pressure is made for a full, or emergency, application of the brakes, and to be closed by a spring when the pressure has escaped from the train pipe. Instead of venting the train pipe through this large opening to the atmosphere, it may be vented to a second larger expansion chamber, which, in some cases may approximately be equal in volume to one third of that of the section of train pipe.

In the accompanying drawings, Figure 1 is a general diagram showing the preferred form of application of the accelerating device to the ordinary arrangement of brake apparatus; Fig. 2 a vertical section of one form of accelerating device embodying this invention; Fig. 3 a similar view showing a slight modification; Fig. 4 a horizontal section showing the valve seat with the valve removed; Fig. 5 a transverse section taken on the line x—x of Fig. 4; Figs. 6, 7 and 8 detail views showing the relative positions of the valve and ports of the accelerating device in the release position, service or partial application, and emergency or full application of the brakes respectively; and Fig. 9 a vertical section showing a modified form of my invention applied to a triple valve device.

Referring to Fig. 1, the accelerating device 1 is preferably located at a point near to the train pipe 4, and connected therewith by a short branch pipe 2, which is separate from the branch pipe 3 leading to the triple valve 5, auxiliary reservoir 6, and brake cylinder 7, for actuating the brakes on each vehicle. The triple valve 5 for actuating the brakes would be the well known ordinary form of plain triple valve which does not contain any of the quick-acting features, and therefore the branch pipe 3 leading to it from the train pipe 4 could advantageously be throttled by a reduced opening where it connects with the train pipe, for instance, by the cock 8 as shown. The advantage of having a reduced opening at this point is that the action of the brakes at the forward end of the train where the pressure in the train pipe is first reduced, is not so strong before the action takes place at the rear, as it would be if this opening was not reduced. This arrangement enables the accelerator to first deal more fully with the train pipe air only, and to make the desired reduction throughout the long train pipe more quickly than could be done if the air from the branch pipe had unrestricted flow to the main train pipe. Further, the reduced opening into the branch pipe 3 leading to the brake set on each vehicle is advantageous in aiding to prevent the brakes from being automatically released when it is desired to have them remain applied, by surges of air pressure in the train pipe. These surges of pressure are temporary, and if the air cannot enter the branch pipe very rapidly, they are not so liable to produce unintended release of the brakes.

Referring to Figs. 2, 4 and 5, the accelerating device 1 consists of three chambers, 14, 15 and 16, preferably arranged as shown in a single casting, and a valve 9 working in a valve chamber 18, operated by a piston 10 working in a cylinder 19 open at one end to the valve chamber 18, and at the other end to the auxiliary chamber 14. The valve chamber 18 is in free communication with the train pipe 4, through branch pipe 2, and in communication with the atmosphere by means of a port 27 and passage 28 as shown in Fig. 4; the expansion chamber 15 is in communication with the valve chamber 18 by means of an admission port 20 and exhaust port 21, and an inlet and outlet passage 22 common to the two ports; the expansion chamber 16 is in communication with the valve chamber 18 by means of a port 23 and passage 24. The auxiliary chamber 14 is also in communication with the valve chamber 18 by means of a port 25 and passage 26. The expansion chamber 15 according to circumstances has a capacity of one-sixth to one-twelfth of the volume of the corresponding train pipe section, and is utilized as additional means for reducing the pressure in the train pipe when a partial, or service, application of the brakes is desired. The larger expansion chamber 16 is roughly double the capacity of the chamber 15, and is utilized as additional means for reducing the pressure in the train pipe when a complete, or emergency, application of the brakes is desired. The chamber 14 has its pressure replenished from the train pipe 4 through the valve chamber 18, and either through the feed groove 11, (Fig. 3) leading by the piston 10 of the valve 9 when in normal running position, or as shown in Fig. 2 by a small passage-way 12 through the piston itself. In the latter case the small passage 12 may constantly remain open, or it may be closed, as shown in Fig. 3 by means of a check valve 13 when the pressure on the train pipe side of the piston is in excess of the pressure on the reservoir side thereof, so as to insure the piston 10 and slide valve 9 moving freely to the extreme position, venting chambers 15 and 16 to the atmosphere, which is the normal running position. The advantage of using the small hole 12 in the piston 10, is that a very small reduction of the train pipe pressure sufficient to make a slight application of the brakes on a short train, or at the forward end of a long train, may be made without opening the train pipe at all to the small chamber 15. This would only be used when approaching a point, such as a water crane or other spot, at a very low speed where it may be desired to stop, and where the stop is sometimes effected by the hand brake on the tender only, or by reversing the engine. The small hole 12 in the piston 10 fulfils the further purpose of permitting the reservoir 14 to gradually equalize its pressure when the train pipe pressure is diminished slightly, such as by making a second or third application of the brakes in graduated practice. In these additional operations of the brake, as already explained, a very small reduction of pressure in the train pipe is sufficient to increase the force of the brake, the triple valve 5 of the brake system having already been moved to the position for applying the brakes, and only the piston and graduating valve thereof needing to be moved to admit more air to the brake cylinder 7. It is therefore not necessary in such operation to quicken the action by venting the train pipe as is desirable in the first application of the brakes. When the pressure is reduced in the train pipe 4 for a first graduated action of the brakes, the excess of pressure in the auxiliary chamber 14 causes the piston 10 and valve 9 to be moved so as to uncover the port 20, whereby communication is opened between the train pipe 4 and the small expansion chamber 15 and at the same time the port 25 of the chamber 14 is uncovered and placed in communication through the exhaust cavity 38 of the valve and the exhaust port 27, with the atmosphere, see Fig. 7, so that the pressure in the chamber 14 is depleted at the same time that the train pipe pressure is reduced. As the compressed air in the auxiliary chamber 14 is thus discharged to the atmosphere, the pressure in said chamber will soon fall below the remaining train pipe pressure and the excess train pipe pressure will then move back the piston 10 and valve 9 to lap, closing both the port 25 from the auxiliary chamber 14 to the atmosphere, and the port 20 for venting the train pipe to the expansion chamber 15. When a greater reduction of train pipe pressure, however, is made on the locomotive for an emergency application, piston 10 and slide valve 9 will move down more rapidly and with greater force against the stem 30, compressing the spring 17 and moving the slide valve 9, (see Fig. 8) far enough to uncover the port 23, and thus open communication between the train pipe 4 and the larger expansion chamber 16, and also opening ports 20 and 21 to the small expansion chamber 15, thus venting a train pipe into both chambers 15 and 16. In this position of the valve the port 25 also communicates through the exhaust-cavity of the valve 9 with the port 27, thus opening communication between the chamber 14 and the atmosphere. When the pressure is entirely exhausted in the train pipe and the chamber 14, the resisting spring 17 will drive the piston 10 and valve 9 back far enough to close the ports 23, 21, connecting the train pipe with the chambers 15 and 16, and when the pressure is restored to the train pipe the piston 10 and slide valve 9 will move back into the normal position, exhausting both chambers 15 and 16 in the atmosphere, see Fig. 6.

The small chamber 15, into which the train pipe air expands for a first graduated application of the brakes, may itself be open to the atmosphere by a very small aperture 37, if preferred, so that the air will escape therefrom gradually soon after it is filled and closed to the train pipe, when it will be in readiness for a second use, when the piston 10 and slide valve 9 return to their normal running or release position, and will not require the exhaust port 21 to connect through the exhaust cavity of the slide valve 9 with the exhaust port 27 to exhaust the chamber to the atmosphere. It will be observed that a certain amount of lost motion is arranged between the stem of the piston 10 and the slide valve 9, and this lost motion may be varied in extent or be dispensed with altogether, as shown in Fig. 3.

It will be obvious that the use of the chamber 16 may be dispensed with, if desired, and the train pipe be vented direct to the atmosphere in an emergency application of the brake, but to accomplish this it would require that the passages permitting air to escape from the train pipe should be properly proportioned to the volume of the train pipe on each car. Although an accelerating device is shown in Figs. 2 to 8, which is adapted to decrease the time required to effect either a service or an emergency application of the brakes, it is not intended to limit the invention to the use of two separate chambers or separate ports for exhausting the train pipe for each kind of application of the brakes, as it is obvious that, by omitting the spring 17 and corresponding parts, chamber 16 and corresponding port 23, the device so constructed could be utilized primarily for accelerating the service application of the brakes with the advantage that it would to this extent hasten any complete or emergency application of the brakes as well.

It will be obvious that in the case of a train fitted with what is known as a quick-acting brake it will only be necessary to provide an accelerator designed to secure quickened action in service applications of the brakes, that is, the accelerator need only be fitted with one exhaust port and one chamber into which fluid under pressure from the train pipe is admitted in the manner above described, since rapidity of action in the case of a complete or emergency application will be secured by the ordinary quick-acting brake apparatus. It will be observed that the conditions of chamber 14, piston 10 and slide valve 9, employed with this device, are similar to the conditions of the auxiliary reservoir and triple valve employed for operating the brakes. Instead of employing separate mechanism, it is within the scope of the invention to employ, as shown in Fig. 9, a slide valve 9 in addition to the regular slide valve of the triple valve 31, but located on the train pipe side of the piston 10' thereof. In this arrangement the train pipe connection is shown at 3, whence the air under pressure passes through the passage 33 into the cap chamber 34, thence into the accelerating valve chamber 18' and cylinder 19', thence by the feed groove and slide valve chamber 36 to the auxiliary reservoir 6. With this arrangement the port 20 leading to the small expansion chamber 15 is connected through the exhaust cavity 38 of the valve 9 with the port 27 leading to atmosphere, port 25 being omitted as it would not be necessary to provide any exit from the auxiliary reservoir to the atmosphere, because the air in the auxiliary reservoir finds exit to the brake cylinder, and this reduction of pressure on the auxiliary reservoir side of the triple valve piston 10 would be sufficient to cause the piston to return, as it does in operating the brakes. Such a valve 9, operated by the ordinary triple valve piston 10', may perform both the quick partial action and the quick complete action of the brakes in any of the forms already described. For the reasons already explained with reference to Fig. 1, however, there are special advantages in separating the device of this invention from the auxiliary reservoir and triple valve for operating the brake itself, and locating the device on a separate branch pipe leading from the main train pipe.

It will be seen that by the use of an accelerating device as above described the time required to effect a partial, or service, application of the brakes throughout a train may be decreased without bringing on an emergency action of the brake. Furthermore, by the use of such a device, either a quickened partial application or an accelerated full and complete action of the brakes can be obtained, if desired, at any moment whether the brakes are already partially applied or not. Furthermore, the two objects mentioned above may be attained and a very small action of the brakes (near the locomotive, at least) may be obtained without producing any exhausting of the train pipe through the device whatever, and, further, after the first quickened partial application of the brakes has been obtained through the operation of this device, subsequent reductions of brake pressures may be made, of as small a magnitude as desired throughout the train without any further action of the device to either quicken the rate or increase the force of the application.

Having now described my invention, what I claim as new and desire to secure by Letters Patent is:—

1. In a fluid pressure brake, the combination with a train pipe and mechanism operated by a reduction in train pipe pressure for applying the brakes, of an expansion chamber and means operated by a gradual reduction in train pipe pressure in service applications for venting air from the train pipe to said chamber, and mechanism operating under a sudden reduction in train pipe pressure to effect a more rapid venting of the train pipe.

2. In a fluid pressure brake, the combination with a train pipe and mechanism operated by a reduction in train pipe pressure for applying the brakes, of an expansion chamber, a valve device operating in service applications to vent air from the train pipe to said chamber, and means operated in emergency applications to effect a more rapid venting of the train pipe.

3. In a fluid pressure brake, the combination with a train pipe and mechanism operated by a reduction in train pipe pressure for supplying air to the brake cylinder, of a small expansion chamber, a valve device having a movable abutment subject to the train pipe pressure and adapted to vent air from the train pipe to the expansion chamber in service applications, and means operating under a sudden reduction in train pipe pressure in emergency applications to effect a more rapid venting of the train pipe.

4. In a fluid pressure brake, the combination with a train pipe and mechanism operated by a reduction in train pipe pressure for supplying air to the brake cylinder, of a small expansion chamber, a valve device operated by a gradual reduction in train pipe pressure in service applications for venting air from the train pipe to said chamber, and by an increase in train pipe pressure for exhausting the air from said chamber, and means operating under a sudden reduction in train pipe pressure in emergency applications to effect a more rapid venting of the train pipe.

5. In a fluid pressure brake, the combination with a train pipe, auxiliary reservoir, triple valve, and brake cylinder, of an accelerator device comprising an expansion chamber, valve mechanism operated by a gradual reduction in train pipe pressure in service applications for venting the train pipe to said chamber, and means operating under a sudden reduction in train pipe pressure to effect a more rapid venting of the train pipe.

6. In a fluid pressure brake, the combination with a train pipe, auxiliary reservoir, triple valve, and brake cylinder, of an accelerator device comprising an expansion chamber and an auxiliary chamber separate from the train pipe, and a valve device operated by the opposing pressures of the train pipe and said auxiliary chamber for venting air from the train pipe to said expansion chamber.

7. In a fluid pressure brake, the combination with a train pipe of a small expansion chamber and a large expansion chamber, and a valve device operated by a gradual reduction in train pipe pressure to vent air from the train pipe to said small expansion chamber and by a sudden or rapid reduction in train pipe pressure to vent air from the train pipe to the large expansion chamber.

8. In a fluid pressure brake, the combination with a train pipe of a small expansion chamber and a large expansion chamber, and a valve device operated by a gradual reduction in train pipe pressure to vent air from the train pipe to said small expansion chamber and by a sudden or rapid reduction in train pipe pressure to vent air from the train pipe to both of said chambers.

9. In a fluid pressure brake, the combination with a train pipe of an expansion chamber having a restricted outlet opening, and a valve device operated by a gradual reduction in train pipe pressure in service applications for venting air from the train pipe to said expansion chamber.

10. In a fluid pressure brake, the combination with a train pipe, a branch pipe having a restricted opening communicating therewith, an auxiliary reservoir, triple valve and brake cylinder connected to said branch pipe, of an accelerator device comprising an expansion chamber and a valve device operated by a gradual reduction in train pipe pressure in service applications for venting air from the train pipe to said expansion chamber.

11. In a fluid pressure brake, the combination with a train pipe, auxiliary reservoir, triple valve, and brake cylinder, of an expansion chamber, and means operated by the movement of the triple valve piston for venting air from the train pipe to said expansion chamber and from the expansion chamber to the atmosphere.

In testimony whereof I have hereunto set my hand.

JOHN WILLS CLOUD.

Witnesses:
ALBERT CHINN,
FRANK P. MOULDEN.